Nov. 16, 1937.  J. W. KELLER  2,099,402
PILL OR TABLET
Filed Jan. 17, 1934
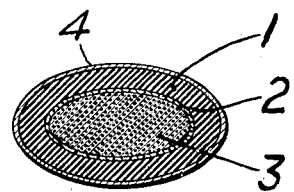
WITNESS:
INVENTOR
Joseph Walter Keller
BY
Augustus B. Stoughton
ATTORNEY.

Patented Nov. 16, 1937

2,099,402

UNITED STATES PATENT OFFICE 2,099,402

PILL OR TABLET

Joseph Walter Keller, Merion, Pa., assignor to Pratt Food Company, Philadelphia, Pa., a corporation of Pennsylvania Application January 17, 1934, Serial No. 706,991

1 Claim. (Cl. 167—82)

Certain drugs used to combat parasitic or diseased conditions of poultry sometimes interfere with each other's action and/or efficiency when administered in combination at a single dose, and this is true in the case of some other drugs when administered to animals.

One object of the present invention is to retain the convenience and other advantages of a single administration, coupled with the distinct and separated action of drugs which would occur if the two dosages were administered separately with a time interval between. According to the present invention a pill or tablet is made containing the desired dose of the drug or drugs, the action of which is desired to come last. Over this pill or tablet, an enteric coating of proper thickness and appropriate composition is applied, followed by another coat, which consists of the dose of the second drug or drugs. Over all this, if desired, a suitable finishing coat may be placed.

The action of the described combination pill or tablet may be explained as follows: Immediately the pill or tablet comes in contact with the digestive juices of the mouth, stomach and/or gizzard, the outer coating of drug or drugs is dissolved and passes on promptly with other liquid contents of the pre-intestinal digestive tract into the intestines where its therapeutic effects begin. The remaining enteric coated portion of the combination pill or tablet, which contains the dosage of the second drug or drugs, normally is retained in the gizzard until broken by its action, when its drug content is released to pass on to the intestines. This release normally takes several hours, giving the first drug or drugs ample time to function before the second dosage from the core of the pill or tablet arrives in the intestines. However, should the enteric coating fail to be broken down by the action, condition and/or contents of the gizzard, the enteric coated dosage eventually passes on intact to the intestines, where the enteric coating, from its nature, will be dissolved and its contents released to function.

Experiments have shown that under normal conditions the administration of a combination tablet or pill of the type described results in the action of the drugs of its two parts being separated by several hours, thereby increasing the efficiency or efficacy of the dosage.

The invention has been described in connection with poultry but the invention is obviously useful in connection with any animals that have an acid digestive tract preceding an alkaline intestinal tract.

It has been said that the pill or tablet is enteric and has a coating of medicament in non-enteric form. The described use of an enteric coating is one way of making the pill or tablet enteric, in the sense of delaying the action of some of the drugs until the alkaline tract is reached, while permitting the medicament in non-enteric form to act in the acid tract. Another way of making the pill enteric in the same sense is to use one of the drugs in a compound or form which only gives up or chemically releases the active ingredient in the alkaline tract, although the compound may change its physical form in the acid tract, the medicament being non-enteric in any sense, becomes effective in the acid tract.

To comply with the rules of the Patent Office a drawing is hereby annexed, and in the drawing the single figure illustrates in cross section a pill or tablet constructed according to one embodiment of the invention.

Referring to the drawing, 3 indicates the drug or drugs for example a preparation of kamala, the action of which is to be delayed, 2 indicates an enteric coating, 1 indicates another coating superposed on the enteric coating and containing the drug or drugs for example a preparation of nicotine which are intended to act prior to the delayed action of the drug or drugs indicated at 1, and 4 indicates a finishing coating which may or may not be applied to the outside of the tablet or pill.

Inasmuch as a pill or tablet differs principally in shape and method of manufacture the words are used synonymously in this description and in the claim.

From the foregoing description it is obvious that the construction specified also permits of simultaneously administering two therapeutically incompatible curative doses to the acid and alkaline areas of the digestive system.

While the ordinary meaning of enteric is pertaining to the intestines, the word is sometimes used in this specification in its trade sense of being so slowly soluble that the coating is not normally dissolved until such time as the included drug would reach the intestines.

It will be obvious to those skilled in the art to which the invention relates that modifications may be made in details of construction and arrangement and in matters of mere form without departing from the spirit of the invention which is not limited in respect to such matters or otherwise than as the prior art and the appended claim may require.

I claim:

A pill containing a drug having a coating which is insoluble in the acid tract and soluble in the alkaline tract, and having another coating which is exterior to the first, the second coating carrying another drug, this coating being soluble in the acid tract but the second drug being effective only in the alkaline tract, whereby a time interval between the action of two simultaneously administered drugs in the alkaline tract is obtained.

JOSEPH WALTER KELLER.